Figure 1:
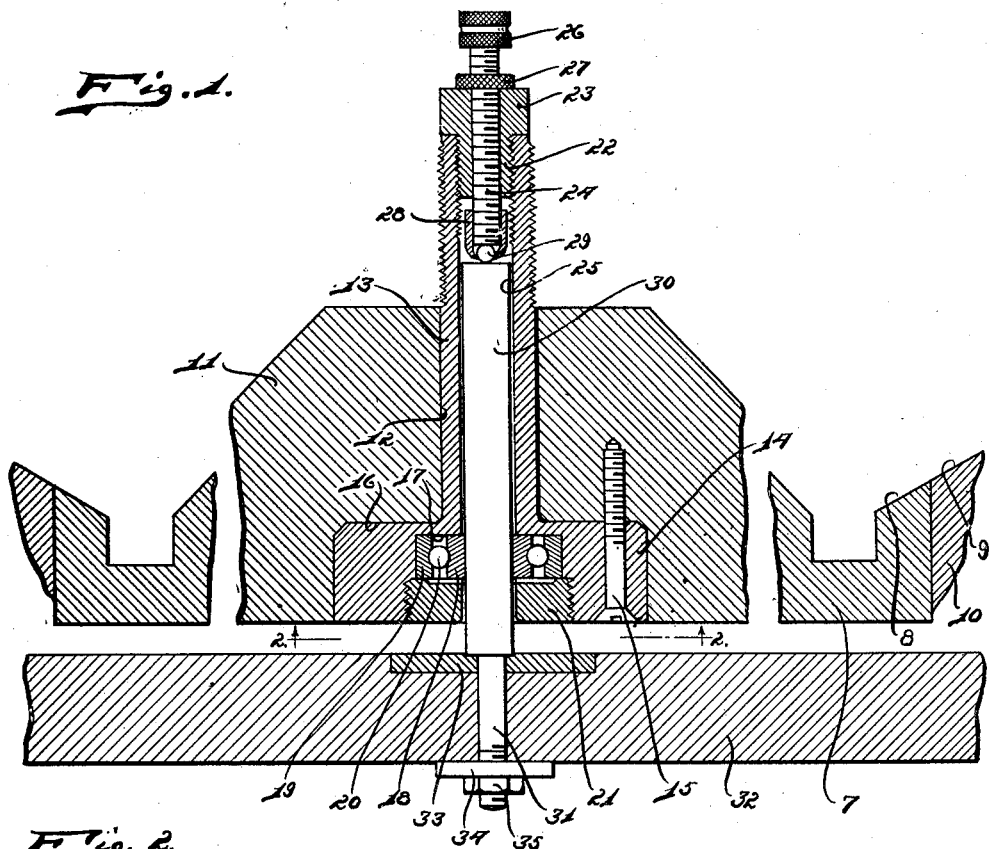

Jan. 13, 1931.  G. WEINBRENNER  1,788,445

REVOLVING CENTER FOR HORIZONTAL WHEELS

Filed March 23, 1928

INVENTOR.
George Weinbrenner.
BY Thos. J. Donnelly
ATTORNEY.

Patented Jan. 13, 1931

1,788,445

UNITED STATES PATENT OFFICE

GEORGE WEINBRENNER, OF DETROIT, MICHIGAN

REVOLVING CENTER FOR HORIZONTAL WHEELS

Application filed March 23, 1928. Serial No. 264,095.

My invention relates to a new and useful improvement in a revolving center for horizontal wheels adapted for use on various articles where it is desired that a wheel or table be maintained in a horizontal position and rotated.

It is particularly adapted for use on phonograph turn tables, roulette wheels, and the like, the invention being illustrated in the drawings as applied to a roulette wheel.

It is an object of the invention to provide an adjustable revolving center and one which will be self-aligning so as to maintain the table in horizontal position and properly aligned relatively to the supporting spindle.

It is another object of the invention to provide a frictionless contact between the supporting portion of the center and the spindle so as to afford maximum rotation with minimum effort.

It is another object of the invention to provide a device of this class which will be simple in structure, economical of manufacture and highly efficient in use.

Other objects will appear hereinafter.

The invention consists in the combination and arrangement of parts hereinafter described and claimed.

The invention will be best understood by a reference to the accompanying drawings which form a part of this specification and in which, Fig. 1 is a central vertical sectional view of the invention showing it applied to a wheel.

Figure 2:
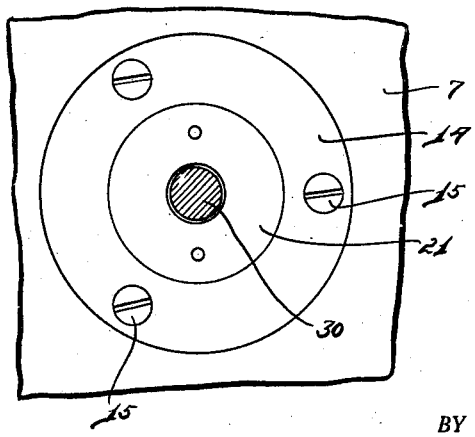

Fig. 2 is a fragmentary view taken on line 2—2 of Fig. 1.

In the drawings I have illustrated the invention adapted for use with a roulette wheel 7 having a peripheral inclined upper surface 8 which, in operation, is normally retained in alignment with the inclined upper surface 9 of the bowl 10. The wheel 7 is provided on its base with the enlargement 11 having a bore 12 formed therein.

The invention comprises a tubular member 13 which projects upwardly from the head 14 which is secured by suitable screws 15 in engagement in a recess 16 formed in the undersurface of the wheel 7. Positioned in a recess 17 formed in the head 14 is a bearing comprising the rings 18 and 19 which are held in spaced relation by the balls 20. A collar 21 is threaded into the recess 17 to retain the bearing in position in the recess.

Threaded into the upper end of the tubular member 13, which is interiorly threaded, is a neck 22 projecting from the head 23, and threaded through the head 23 and the neck 22 so as to project into the bore 25 of the member 13 is a stem 24, upon the upper end of which is fixedly mounted a knurled head 26. A lock nut 27 is threaded on the stem 24 to lock it in its various axial positions relatively to the head 23.

Threaded on the lower end of the stem 24 is a cup-shaped member 28 having an opening formed in its base, through which is exposed a ball 29 preferably made from steel.

It will be noted that the cup-shaped member 28 is threaded on the stem 24 only a predetermined distance so that the ball 29 is allowed play in the cup-shaped member. This ball is adapted to engage the upper surface of the supporting spindle 30 while also in engagement with the end of the stem 24.

The spindle 30 is provided with the reduced portion 31 which is projected through the supporting table 32, in a recess in which is positioned a washer embracing the reduced portion 31 and engaging the shoulder of the spindle formed at the termination of the reduced portion 31. A washer 34 engages the lower face of the table 32 and a nut 35 is threaded on the reduced portion 31 to securely bind the same in vertical position on the table 32.

The bearing comprising the rings 18 and 19 serves to engage the periphery of the spindle 30 and the ball 29 serves as a supporting member for the table. Since this ball is free for universal movement upon a spinning of the table on the spindle, it is evident that the ball will not form in the end of the spindle a sharply pointed recess and that the wear on the spindle and on the stem 24 will be reduced to a minimum by the use of the ball.

Furthermore, since the ball has free movement in the cup-shaped member 28, it serves to align the table with the spindle 30 so that the center support may be termed as aligning, and since it is desired that the surfaces 8 and 9 be maintained always in alignment, it is evident that a threading of the stem 24 in the members 23 and 22 will effect a raising or a lowering of the table when desired so that should any wear be effected in the contacting parts, while the table is being spun, an adjustment to compensate for such wear may be effected.

Upon any damage resulting to the ball 29, or upon deformation of the same for any reason, it is evident that by removing the head 23 from the tubular member 13 and detaching the cup-shaped member 28, the ball may be easily and quickly removed and replaced.

While I have illustrated and described the preferred form of my invention, I do not wish to limit myself to the precise details of structure shown, but desire to avail myself of such variations and modifications as come within the scope of the appended claims.

Having thus described by invention, what I claim as new and desire to secure by Letters Patent is:

1. A revolving center for horizontal wheels adapted for rotating about a vertically extended spindle, comprising: a tubular member; a nut-forming member threaded in the upper end of said tubular member; a stem threaded through the center of said nut-forming member and projecting inwardly of said tubular member; a ball retainer mounted on the inner end of said threaded member; and a ball loosely positioned in said retainer and engageable with the inner end of said threaded member and the upper end of said spindle for rotatably mounting said wheel on said spindle.

2. A revolving center for horizontal wheels adapted for rotating about a vertically extended spindle, comprising: a tubular member; a nut-forming member threaded in the upper end of said tubular member; a stem threaded through the center of said nut-forming member and projecting inwardly of said tubular member; a ball retainer mounted on the inner end of said threaded member; a ball loosely positioned in said retainer and engageable with the inner end of said threaded member and the upper end of said spindle for rotatably mounting said wheel on said spindle; and means for locking said threaded member against rotatable movement in said nut-forming member.

3. A revolving center for horizontal wheels adapted for rotating about a vertically extended spindle, comprising: a tubular member; a nut-forming member threaded in the upper end of said tubular member; a stem threaded through the center of said nut-forming member and projecting inwardly of said tubular member; a ball retainer mounted on the inner end of said stem; a ball loosely positioned in said retainer and engageable with the inner end of said stem and the upper end of said spindle for rotatably mounting said wheel on said spindle; means for locking said stem against rotatable movement in said nut-forming member; and an anti-friction bearing carried by said tubular member and engageable with said spindle adjacent the lower end thereof.

In testimony whereof I have signed the foregoing specification.

GEORGE WEINBRENNER.